(12) United States Patent
Nakajima

(10) Patent No.: US 8,310,736 B2
(45) Date of Patent: Nov. 13, 2012

(54) IMAGE READING DEVICE

(75) Inventor: Yuki Nakajima, Ogaki (JP)

(73) Assignee: Brother Kogyo Kabushiki Kaisha, Nagoya-shi, Aichi (JP)

( * ) Notice: Subject to any disclaimer, the term of this patent is extended or adjusted under 35 U.S.C. 154(b) by 391 days.

(21) Appl. No.: 12/723,276

(22) Filed: Mar. 12, 2010

(65) Prior Publication Data
US 2010/0231991 A1    Sep. 16, 2010

(30) Foreign Application Priority Data

Mar. 16, 2009  (JP) .................................. 2009-063218

(51) Int. Cl.
*H04N 1/04* (2006.01)
(52) U.S. Cl. ......... 358/474; 358/475; 358/461; 358/497
(58) Field of Classification Search .................. 358/474, 358/475, 461, 497, 498
See application file for complete search history.

(56) References Cited

U.S. PATENT DOCUMENTS

| | | | | |
|---|---|---|---|---|
| 7,952,770 B2 * | 5/2011 | Ikeno et al. | .................... | 358/461 |
| 2004/0223194 A1 * | 11/2004 | Naito et al. | .................... | 358/497 |
| 2005/0029352 A1 * | 2/2005 | Spears | ........................... | 235/454 |
| 2006/0245013 A1 | 11/2006 | Ikeno et al. | | |
| 2006/0250661 A1 | 11/2006 | Susaki | | |
| 2007/0285739 A1 * | 12/2007 | Nakano et al. | ................. | 358/474 |
| 2008/0174836 A1 | 7/2008 | Yoshihisa | | |

FOREIGN PATENT DOCUMENTS

| | | |
|---|---|---|
| JP | 02-065367 | 3/1990 |
| JP | 09-252383 | 9/1997 |
| JP | 2001245111 A | 9/2001 |
| JP | 2006-311219 | 11/2006 |
| JP | 2006-311316 | 11/2006 |
| JP | 2008083323 A | 4/2008 |

OTHER PUBLICATIONS

Notification of Reasons for Refusal for Japanese Patent application No. 2009-063218 mailed Mar. 1, 2011.
Notification of Reasons for Refusal for Japanese patent application No. 2009-063218 mailed Oct. 25, 2011.

* cited by examiner

*Primary Examiner* — Houshang Safaipour
(74) *Attorney, Agent, or Firm* — Banner & Witcoff, Ltd.

(57) ABSTRACT

An image reading device includes: a light-source adjusting device, a storage, a first converting device and a determining device. The adjusting device adjusts brightness of the light source to the brightness corresponding to the one of a plurality of reading modes. The storage stores an reference adjusting value and converting information, the reference adjusting value being adjusted in a state where external light is not incident on a platen, the converting information being for converting the reference adjusting value of the reference mode into the reference adjusting value of another reading mode. The first converting device refers to the converting information and converts the reference adjusting value into the value of the selected reading mode. The determining device determines presence or absence of external light incident on the platen, comparing the converted reference adjusting value with the light-source adjusting value adjusted by the adjusting device.

5 Claims, 9 Drawing Sheets

FIG.3

| READING MODE | READING RESOLUTION | READING SPEED | LIGHTING TIME [MILLISECOND] | CONVERTING INFORMATION | |
|---|---|---|---|---|---|
| | | | | RESOLUTION RATIO | LIGHTING-TIME RATIO |
| 1200 DPI HIGH-SPEED MODE | 1200 dpi | HIGH SPEED | Ta | 2 | 1 |
| 600 DPI HIGH-SPEED MODE (REFERENCE MODE) | 600 dpi | HIGH SPEED | Ta | 1 | 1 |
| 600 DPI LOW-SPEED MODE | 600 dpi | LOW SPEED | Tb (Tb>Ta) | 1 | Ta/Tb |
| 300 DPI HIGH-SPEED MODE | 300 dpi | HIGH SPEED | Ta | 1/2 | 1 |
| 300 DPI LOW-SPEED MODE | 300 dpi | LOW SPEED | Tb (Tb>Ta) | 1/2 | Ta/Tb |

IMAGE READING DEVICE

CROSS REFERENCE TO RELATED APPLICATION

This application claims priority from Japanese Patent Application No. 2009-63218 filed on Mar. 16, 2009. The entire content of this priority application is incorporated herein by reference.

TECHNICAL FIELD

The present invention relates to image forming devices.

BACKGROUND

A known image reading device reads a reference member, which is a basis for brightness of an image reading means, and sets an light-source adjusting value of a light source. The image reading device determines presence or absence of external light on a basis of a value read from the reference member and, upon determination that the external light is present, emits light from the light source using the light-source adjusting value that has been preset during manufacturing or before shipment.

However, in a case of reading a document while changing the brightness of the light source in each reading mode determined under reading conditions such as a resolution and a reading speed, the brightness of the light source differs depending on the reading mode. Because of this, the known image reading device, which determines using the light-source adjusting value that has been preset during manufacturing or before shipment could make erroneous decision on the presence or absence of the external light.

Thus, there is a need for an image reading device that can determine the presence or absence of the external light with higher accuracy and with a better performance even when the brightness of the light source differs depending on the reading mode.

SUMMARY

An aspect of the present invention is an image reading device including: a platen configured to allow a document to be placed thereon; a reading device including a light source for emitting light toward the document placed on the platen, the reading device being configured to read the document on a basis of the light emitted from the light source and reflected by the document; a reference member configured to reflect the light emitted from the light source; a selecting device configured to select one of a plurality of reading modes that are different from each other in brightness of the light source when reading the document; a light-source adjusting device configured to adjust brightness of the light source to the brightness corresponding to the one of the plurality of reading modes selected by the selecting device, wherein the light-source adjusting device causes the reading device to read the reference member and adjusts an light-source adjusting value on a basis of a result of the reading; a storage configured to store an reference adjusting value and converting information, the reference adjusting value being the light-source adjusting value adjusted in a state where external light is not incident on the platen in a reference mode that is a reference out of the plurality of reading modes, the converting information being for converting the reference adjusting value of the reference mode into the reference adjusting value of another one of the plurality of reading modes; a first converting device configured to refer to the converting information and convert the reference adjusting value of the reference mode into the reference adjusting value of the selected reading mode; and a determining device configured to determine presence or absence of external light incident on the platen, wherein the determining device compares the reference adjusting value with the light-source adjusting value, the reference adjusting value of the selected reading mode being converted by the first converting device, the light-source adjusting value being adjusted by the light-source adjusting device.

BRIEF DESCRIPTION OF THE DRAWINGS

FIG. 3 is a table as illustrations of reading modes;

DETAILED DESCRIPTION

First Illustrative Aspect

A first illustrative aspect will be described with reference to FIGS. 1 through 9.

(1) Configuration of Multi-Function Machine

Figure 1:
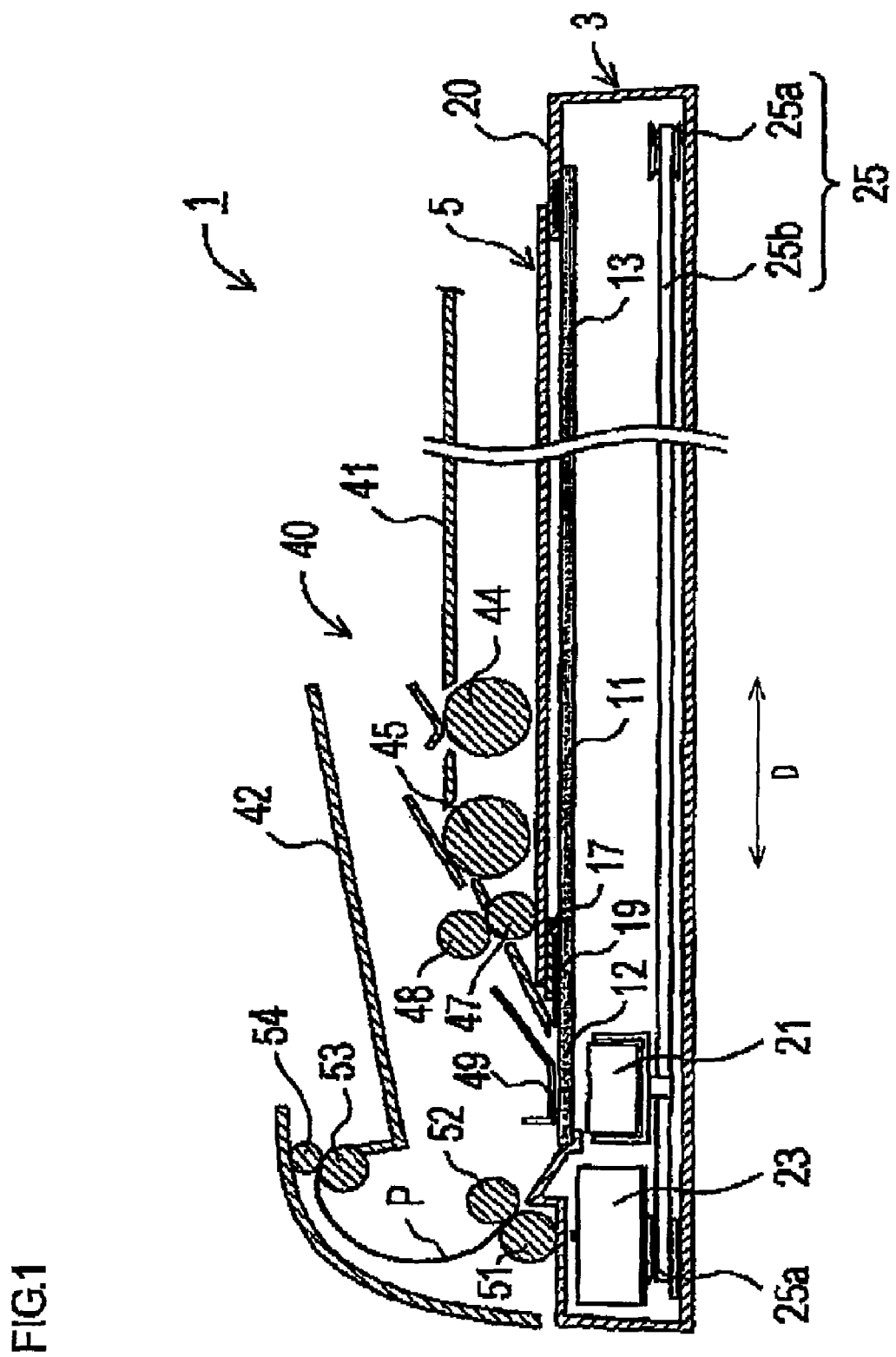
FIG. 1 is a schematic diagram of an image reading device of a first illustrative aspect in accordance with the present invention.

FIG. 1 is a diagram of an image reading device 1 included in a multi-function machine having a copy function, a scanner function, a facsimile function, a printer function, etc.

The image reading device 1 is configured as a scanner device of a so-called flat-bed type. The image reading device 1 includes a unit body 3 and an FB (Flat Bed) cover 5. The unit body 3 includes a first reading face 11 and a second reading face 12 in an upper portion thereof. The FB cover 5 can move between an open state and a closed state on the top of the unit body 3. In the closed state, the FB cover 5 covers a top face of the unit body 3.

The unit body 3 includes a platen glass 13, a casing 20, a positioning member 17, a white reference member 19, a reading device 21, an FB motor 23, and a belt mechanism 25. The platen glass 13 configures the first reading face 11 and the second reading face 12. The casing 20 supports the platen glass 13. The positioning member 17 can be used for positioning a document to be placed on the first reading face 11. The FB motor 23 can move the reading device 21.

The positioning member 17 is removably attached to the casing 20 and divides a surface of the platen glass 13 into the first reading face 11 and the second reading face 12. The first reading face 11 is an area for reading the document that has been placed on the surface thereof by the user. The second reading face 12 is an area for reading a document P that has been conveyed thereto by a document feeder 40. The document feeder 40 is provided on the FB cover 5.

The reading device 21 (an illustration of a reading device) is accommodated below the platen glass 13 so as to be movable in a subscanning direction (a direction D in the figure) that is parallel to the surface of the platen glass 13. Under the power generated by the FB motor 23, the belt 25*b* rotates around two rollers 25*a* included in the belt mechanism 25. The reading device 21 is secured to a belt 25*b* so as to move in the subscanning direction accompanying the belt 25*b*.

The white reference member 19 is disposed between the positioning member 17 and the platen glass 13 in a manner extending in a main scanning direction that is perpendicular to the figure. The white reference member 19 is a white member having a higher reflectivity and is used for generating a white reference value. The white reference value is used for adjusting brightness of a light source 22 and shading correction.

When reading the document P on the second reading face 12, the reading device 21 moves to an area below the second reading face 12 and stops moving therein. On the other hand, when reading the document on the first reading face 11, the reading device 21 is conveyed in the subscanning direction below the first reading face 11 by operation of the FB motor 23 and the belt mechanism 25. The FB motor 23 and the belt mechanism 25 correspond to a conveying device of the present invention.

The FB cover 5, which includes the document feeder 40 as described above, conveys the document P from a sheet supply tray 41 onto the second reading face 12 and, after the reading by the reading device 21, discharges the document to a discharge tray 42.

Specifically, the document feeder 40 includes a sheet supply rollers 44, 45 disposed at a start point of the conveying path. The sheet supply rollers 44, 45 convey the document P from the sheet supply tray 41 toward a downstream of the conveying path. Then, conveying rollers 47, 48 convey the document P toward the further downstream of the conveying path.

In the downstream of the conveying rollers 47, 48 in the conveying path, an upper plate 49 is disposed in a manner having a gap between the second reading face 12. The document P after being conveyed by the conveying roller 47, 48 passes the gap between the upper plate 49 and the second reading face 12, is conveyed by two conveying rollers 51, 52 provided in the further downstream of the conveying path, and then, is discharged onto the discharge tray 42 by two discharging rollers 53, 54.

(2) Electrical Configuration of Reading Apparatus

Figure 2:
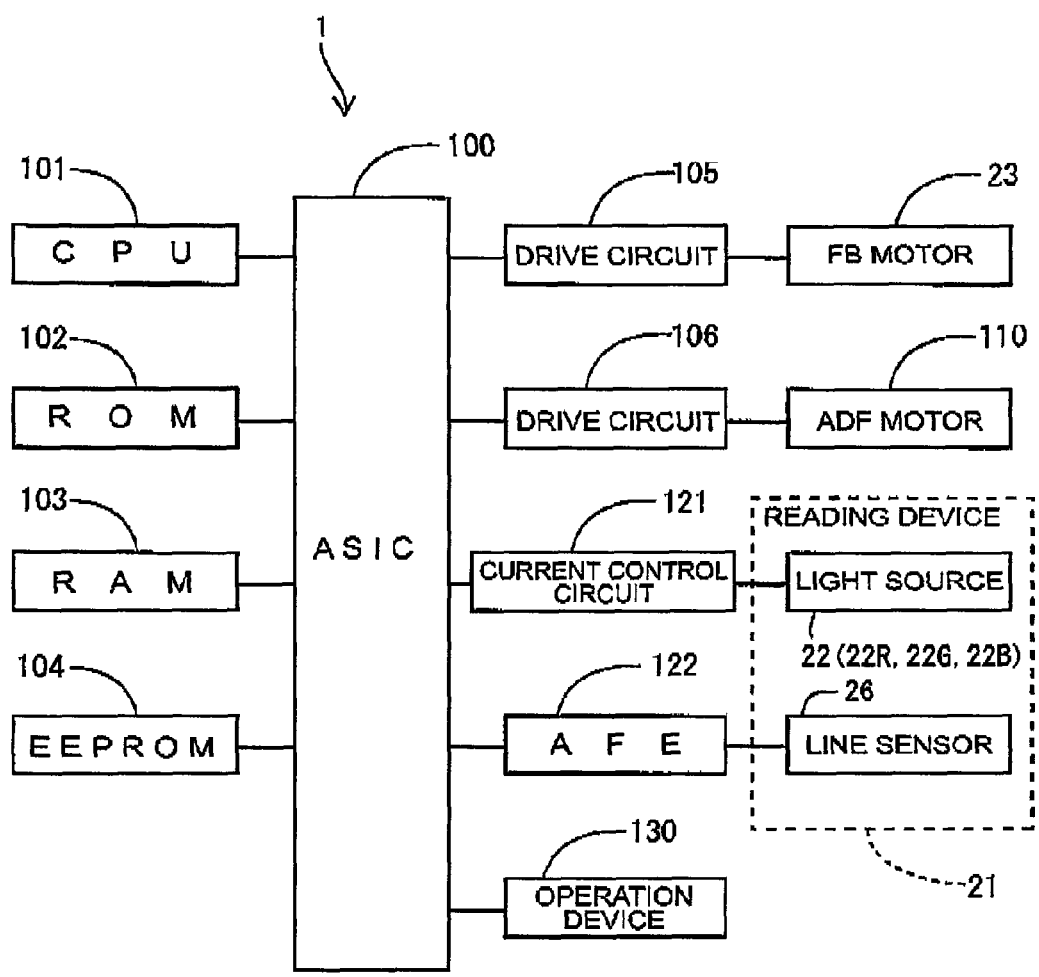
FIG. 2 is a block diagram of an electrical configuration of the image reading device.

As shown in FIG. 2, the image reading device 1 includes an ASIC 100, a CPU 101 (an illustration of a light-source adjusting device, a first converting device, a determining device, and a second converting device), a ROM 102, a RAM 103, an EEPROM 104 (an illustration of a storage), drive circuits 105, 106, the reading device 21, an AFE 122, and an operation device 130 (an illustration of a selecting device).

The ASIC 100 is connected to the FB motor 23 and an ADF (Auto Document Feed) motor 110 via the drive circuits 105, 106. The ADF motor 110 drives the rollers of the document feeder 40.

The unit body 3 includes the operation device 130 (not illustrated in FIG. 1) disposed in the front portion thereof. The operation device 130 is connected to the ASIC 100. The user can perform reading-mode selection, reading instruction, etc. by operating the operation device 130.

The reading device 21 includes a line sensor 26 and a light source having light sources 22R, 22G, 22B (not illustrated in the figure). The line sensor 26 has a plurality of light receiving elements arranged in line in the main scanning direction. The light source 22R,22G,22B has respectively a plurality of LEDs that are arranged in line. And, the light source 22R, 22G,22B can emit light of red (R), green (G), blue (B), respectively.

The ASIC 100 is connected to the light source 22 of the reading device 21 via a current control circuit 121. While the ASIC 100 outputs a PWM signal as a pulse signal, the current control circuit 121 applies current to the light source 22 on a basis of the PWM signal.

The CPU 101 can adjust the brightness of the light source 22 via the ASIC 100 by adjusting the duty ratio (an LED-PWM adjusting value) of a pulse width to a pulse period of the PWM signal.

The CPU 101 can adjust also the lighting time of the light source 22 via the ASIC 100 by adjusting a duty ratio (LED-DUTY adjusting value) of a period to output the PWM signal to a period not to output the PWM signal in a line period. Thus, in this illustrative aspect, a document reading speed or, in other words, a line period can be changed, and the lighting time of the light source 22 is adjusted in proportion to the period per line. For example, where the line period is doubled, the lighting time of the light source is also adjusted so as to be doubled. Separately from this adjustment, in this illustrative aspect, the LED-DUTY adjusting value described above is adjusted for fine adjustment of the lighting time.

The ASIC 100 is also connected to the line sensor 26 via the AFE (Analog Front End) 122. The AFE 122 includes an A/D conversion circuit.

(3) Reading Mode

The image reading device 1 stores a table illustrated in FIG. 3 as a conversion table in the EEPROM 104. Character strings "1200 dpi", "600 dpi", and "300 dpi" contained in the names of the reading modes indicate the reading resolutions of the respective reading modes (each hereinafter referred to as the "resolution"), while character strings "high speed" and "low speed" indicate the reading speeds when the document is being read in the respective reading modes. The reading speed is a speed for the reading device 21 to be conveyed. With any resolution, image data quality obtained by low-speed reading is higher than by high-speed reading.

As described above, the multi-function machine has the copy function, the scanner function, and the facsimile function. In this illustrative aspect, the functions are different in selectable reading modes. Specifically, for example, "600 dpi high-speed mode" alone is selectable in the copy function; either of "1200 dpi high-speed mode" and "600 dpi low-speed mode" is selectable in the scanner function; and either of "300 dpi high-speed mode" and "300 dpi low-speed mode" is selectable in the facsimile function. Note that this may be modified such that any reading mode is selectable regardless of the function.

Figure 4:
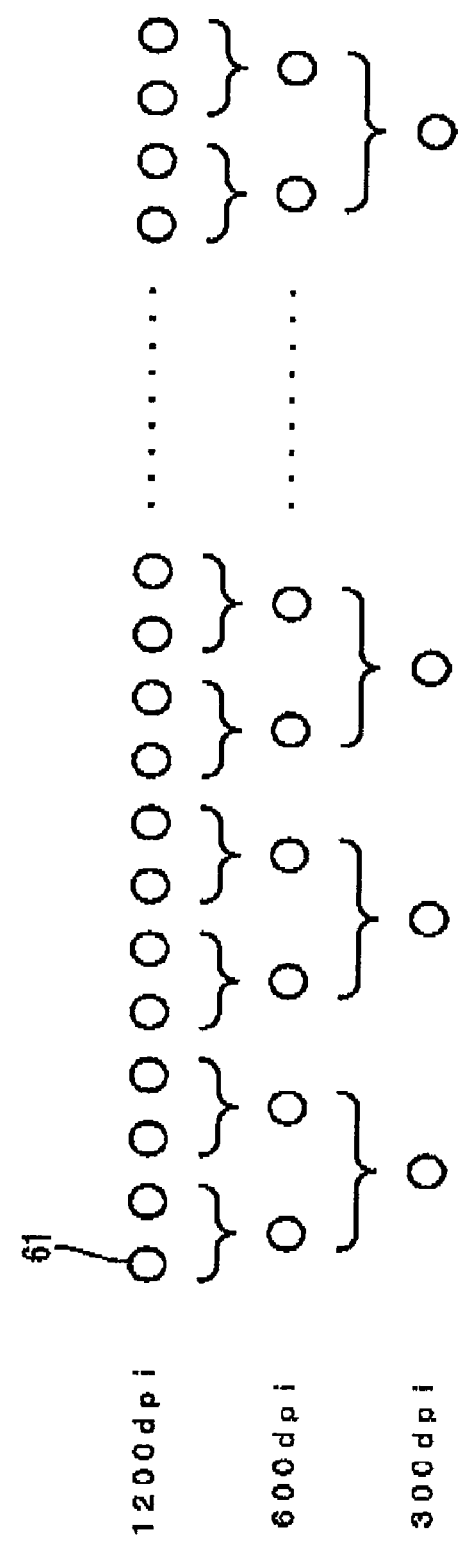
FIG. 4 is an schematic diagram of a relation between resolution and brightness of the light source.

(3-1) Relation Between Resolution and Accumulation Amount of Charge of Light Source FIG. 4 illustrates pixel arrangements per line of the image data having the resolution of 1200 dpi, 600 dpi and 300 dpi. Each circle 61 in the figure represents a pixel. Note that, in FIG. 4, only one of the pixels is designated by a reference character, while designation of the other pixels by the reference character is omitted.

Regardless of which reading mode is selected, the ASIC 100 orders reading device 21 to read the document at reading condition of resolution 1200 dpi. Then, in a case where the reading mode having the resolution of, for example, 600 dpi is selected, the ASIC 100, with respect to the image data generated by reading the document at 1200 dpi, sums the accumulation amounts of charge of every adjacent two pixels in every pixel array corresponding to a line of the line sensor 26 (i.e. in every pixel array arranged in the main scanning direction) and in every RGB. The accumulation amount of charge at 600 dpi is thus calculated.

Note however that such a simple calculation of the accumulation amount of charge at 600 dpi produces a value twice the accumulation amount at 1200 dpi. Therefore, when the reading mode having the resolution of 600 dpi is selected, the CPU 101 orders the reading device 21 to read with the brightness of the light source 22 adjusted to one-half of the brightness when the reading mode of 1200 dpi is selected.

It is similar also in the case where the reading mode having the resolution of 300 dpi is selected: the CPU 101 orders the reading device 21 to read the document with the brightness adjusted to one fourth of the brightness when the reading mode of 1200 dpi is selected.

That is, in this illustrative aspect, where the resolution is one half of the resolution of the reference reading mode, the brightness of the light source 22 is adjusted to one half (an illustration of a resolution ratio) of the brightness of the reference reading mode.

(3-2) Relation Between Lighting Time and Brightness of Light Source

Figure 5:
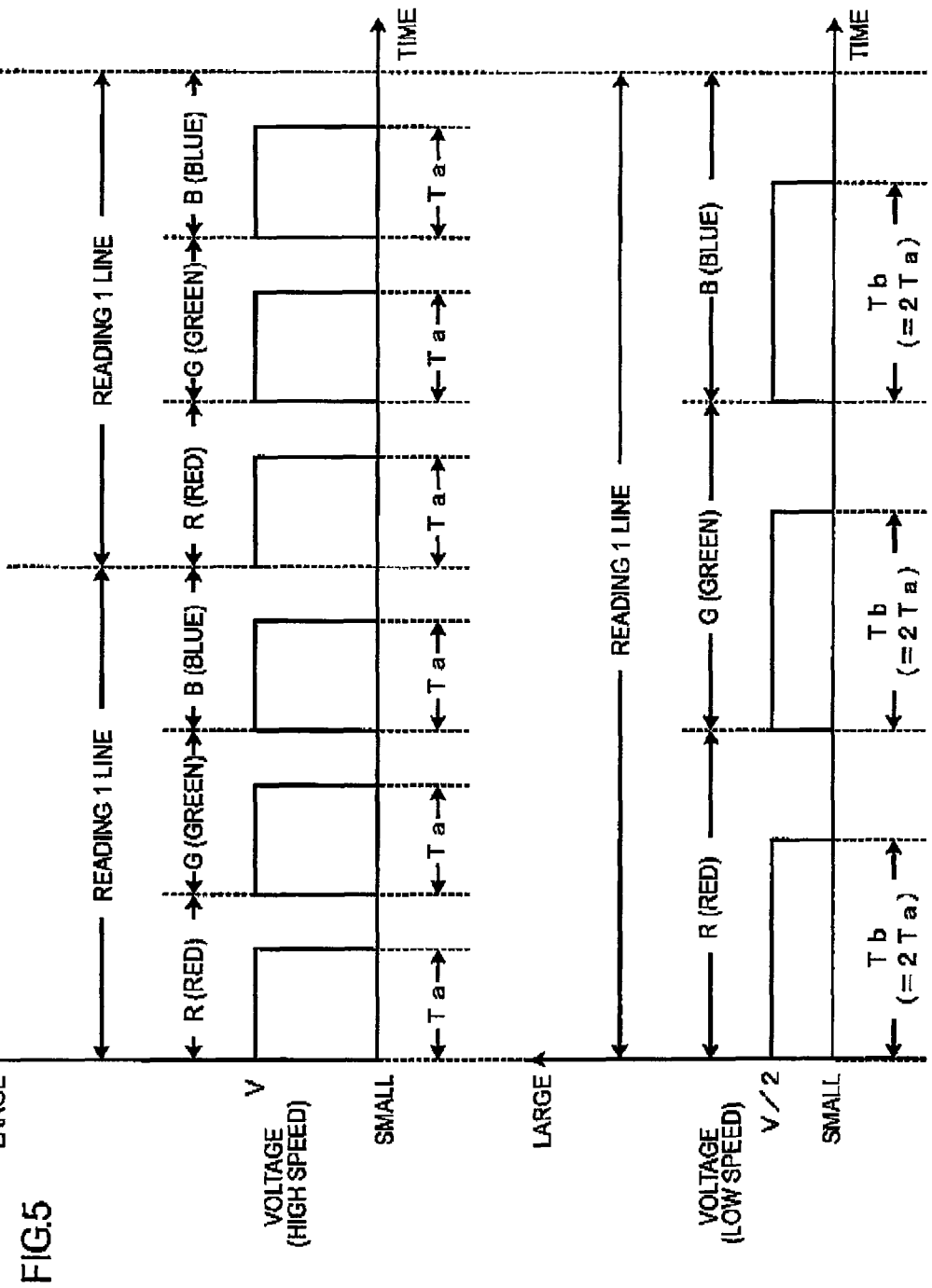
FIG. 5 is a diagram illustrating a relation between lighting time and the brightness of the light source.

FIG. 5 illustrates a relation between the current flowing to the light source 22 (or the applied voltage to the light source 22) in the high-speed reading and the lighting time. FIG. 5 also illustrates a relation between the current flowing to the light source 22 in the low-speed reading and the lighting time.

In the low-speed document reading, the reading device 21 reads the document while moving at a low speed. Therefore, the lighting time in the low-speed document reading is longer than the lighting time in the high-speed reading. Specifically, for example, where the high speed is denoted by X [m/millisecond], the low speed is denoted by Y [m/millisecond] (X>Y), the lighting time per line in the high-speed reading is denoted by Ta [millisecond], and the lighting time per line in the low-speed reading is denoted by Tb [millisecond] (Tb>Ta); then, a relation represented by Formula 1 as follows applies between them:

$$X/Y = Tb/Ta \qquad \text{Formula 1}$$

In this case, when the brightness of the light source 22 in the low-speed document reading and the brightness of the light source 22 in the high-speed document reading are set to be the same, the charge that the receiving elements of the line sensor 26 accumulate in the low-speed reading is more than the charge in the high-speed reading. Accordingly, the accumulation amount of charge in the low-speed reading is, by a simple calculation, Tb/Ta (>1 (one)) of the accumulation amount of charge in the high-speed reading. That is, even if the same document is read, the image represented that the image data generated by the low-speed reading represents is undesirably generally brighter than the image that the image data generated by the high-speed reading represents.

To compensate this, the CPU 101 adjusts the LED-PWM adjusting value so as to, in the low-speed reading, adjust the current flowing through the light source 22 to Ta/Tb (<1 (one)) of the current in the high-speed reading or, in other words, adjust the brightness of the light source 22 to be Ta/Tb. This can make it possible not to produce a big difference between, when the same document is read, the general brightness of the image that the image data generated by the low-speed reading represents and the general brightness of the image that the image data generated by the high-speed reading represents.

That is, in this illustrative aspect, when the lighting time becomes Tb/Ta of the lighting time of the reading mode which is the reference, the brightness of the light source 22 is adjusted to Ta/Tb (an illustration of a lighting-time ratio) of the brightness of the reference reading mode. Note that the lighting-time ratio is, in other words, a reciprocal of the reading speed ratio.

(3-3) Reference Mode

In this illustrative aspect, the "600 dpi high-speed mode" will be illustratively described as the reading mode which is the reference (hereinafter referred to as a "reference mode"). In a case where the "600 dpi high-speed mode" is identified as the reference mode, a target value of the brightness of the light source 22 in document reading in the other reading mode or, in other words, a target value of the accumulation amount of charge in reading the white reference member 19 in the other reading mode can be represented by a following formula:

[Target value of accumulation amount of charge]= [target value in document reading in the "600 dpi high-speed mode"]*[resolution ratio]*[lighting-time ratio]      Formula 2

Here, the resolution ratio is a value obtained by dividing the resolution of the other reading mode by the resolution of the reference mode (600 dpi). The lighting-time ratio is a value obtained by dividing the lighting time of the reference mode by the lighting time of the other reading mode. The reading modes illustrated in FIG. 3 are different from each other in the products of the resolution ratios and the lighting-time ratios.

(4) Adjustment of Brightness of Light Source and Adjustment of Lighting Time

The brightness of the lighting source can vary due to deterioration with age or, even in a case of no deterioration with age, the brightness immediately after lighting and the brightness after elapse of a certain time can be different. To compensate this, upon receipt of instruction to read the document, the CPU 101 adjusts the lighting time of the light source 22 every time before reading the document.

Adjustment of the brightness of the light source 22 and adjustment of the lighting time will hereinafter be described by illustrating the reference mode.

(4-1) Outline of Adjustment of Brightness of Light Source

The adjustment of the brightness of the light source is operated for each of the light sources of R, G, B. The red (R) light source 22R will herein be described as an illustration.

Upon receipt of the instruction to read the document, the CPU 101, first, sets an initial value to an LED-PWM adjusting value. The LED-PWM adjusting value is an light-source adjusting value for adjusting the brightness of the light source 22R.

Next, the CPU 101 sets an initial value to the LED-DUTY adjusting value. The LED-DUTY adjusting value is an adjusting value for adjusting the lighting time of the light source 22R.

Next, the CPU 101 moves the reading device 21 to the area below the white reference member 19 and turns on the light source 22R for a time period that has been set by the initial value.

Next, the CPU 101 determines whether the pixel signal outputted from the AFE 122 overflows the target value of the accumulation amount of charge that the reading device 21 is to receive during a line period. If the pixel signal does not overflow, the CPU 101 increases the LED-PWM adjusting value, i.e. increases the brightness of the light source 22R, step by step until the pixel signal overflows.

At overflow of the pixel signal, the CPU 101 reduces the LED-PWM adjusting value step by step to adjust it to a value immediately before the pixel signal overflows. Thus, the brightness of the light source 22R is adjusted to the brightness according to the reference mode.

While the red (R) light source 22R is hereinabove illustratively described, the green (G) light source 22G and the blue (B) light source 22B are also adjusted in a similar manner.

(4-2) Outline of Adjustment of Lighting Tune

The adjustment of the lighting time of the light source is operated for each of the light sources of R, G, B. The red (R) light source 22R will be described as an illustration.

First, the CPU 101 sets an initial value to the LED-DUTY adjusting value of the light source 22R.

Next, the CPU 101 turns on the light source 22R for a time period set by the initial setting.

Next, the CPU 101 determines whether the pixel signal outputted from the AFE 122 overflows. If the pixel signal does not overflow, the CPU 101 increases the LED-DUTY adjusting value, i.e. elongates the lighting time, step by step until the pixel signal overflows.

Then, at overflow of the pixel signal, the CPU 101 reduces the LED-DUTY adjusting value step by step to adjust it to a value immediately before the pixel signal overflows. Thus, the lighting time of the light source 22R is adjusted to a lighting time according to the reference mode.

While the red (R) light source 22R is hereinabove illustratively described, the green (G) light source 22G and the blue (B) light source 22B are also adjusted in a similar manner.

(5) Reference Adjusting Value and Reference Lighting Time

Adjustment of the brightness of the light source 22 should be operated in a state where the FB cover 5 is closed and the external light is not incident on the platen glass 13 or, in other words, in a state where the external light is not incident on the line sensor 26. This is because the brightness of the light source 22 is reduced by the amount for the incident external light.

However, adjustment of the brightness is not always operated in the state where the FB cover 5 is closed, because, for example, in a case where the document is thick (such as a book), the FB cover 5 is raised up from the platen glass 13. In this case, if the external light is incident when the brightness of the light source 22 is being adjusted, while the book covers the platen glass 13 so that the external light is mostly not incident when the book is being read, the brightness of the light source 22 is reduced by the amount for the external light. This causes a generally lower accumulation amount of charge, and a dark image is generated.

Therefore, in this illustrative aspect, an reference adjusting value is stored in the EEPROM 104 in advance. The reference adjusting value is an LED-PWM adjusting value adjusted in a state where the FB cover 5 is closed and the external light is not incident to the platen glass 13.

Then, in the document reading, the CPU 101 compares the LED-PWM adjusting value adjusted before reading the document and the reference adjusting value stored in the EEPROM 104, thereby determining presence or absence of the incident external light. If it is determined that the incident external light is present, the CPU 101 turns on the light source 22 at the reference adjusting value and reads the document. On the other hand, if it is determined that the incident external light is absent, the CPU 101 turns on the light source at the LED-PWM adjusting value and reads the document.

Note however that storing the reference adjusting value with respect to each of the reading modes requires much storage area in the EEPROM 104. Therefore, in this illustrative aspect, the reference adjusting value of the reference mode and converting information for converting the reference adjusting value of the reference mode into reference adjusting values of the other reading modes are stored in the EEPROM 104.

Then, in the document reading in the reading mode other than the reference mode, the CPU 101 refers to the converting information and converts the reference adjusting value of the reference mode into the reference adjusting value of the other reading mode. The converting information is, namely, the resolution ratio and the lighting-time ratio of each reading mode. By this, because the reference adjusting values of the other reference modes do not have to be stored in the EEPROM 104, the storage area in the EEPROM 104 can be saved.

In this illustrative aspect, with respect to the lighting time, likewise, the lighting time adjusted in the state where the external light is not incident in the reference mode is stored as a reference lighting time in the EEPROM 104 in advance. Then, when reading the document in the reading modes other than the reference mode, the CPU 101, if it is determined that the incident external light is present, multiplies the reference lighting time by the reciprocal of the lighting-time ratio, thereby converting the reference lighting time into lighting times of the other reading modes.

Figure 6:
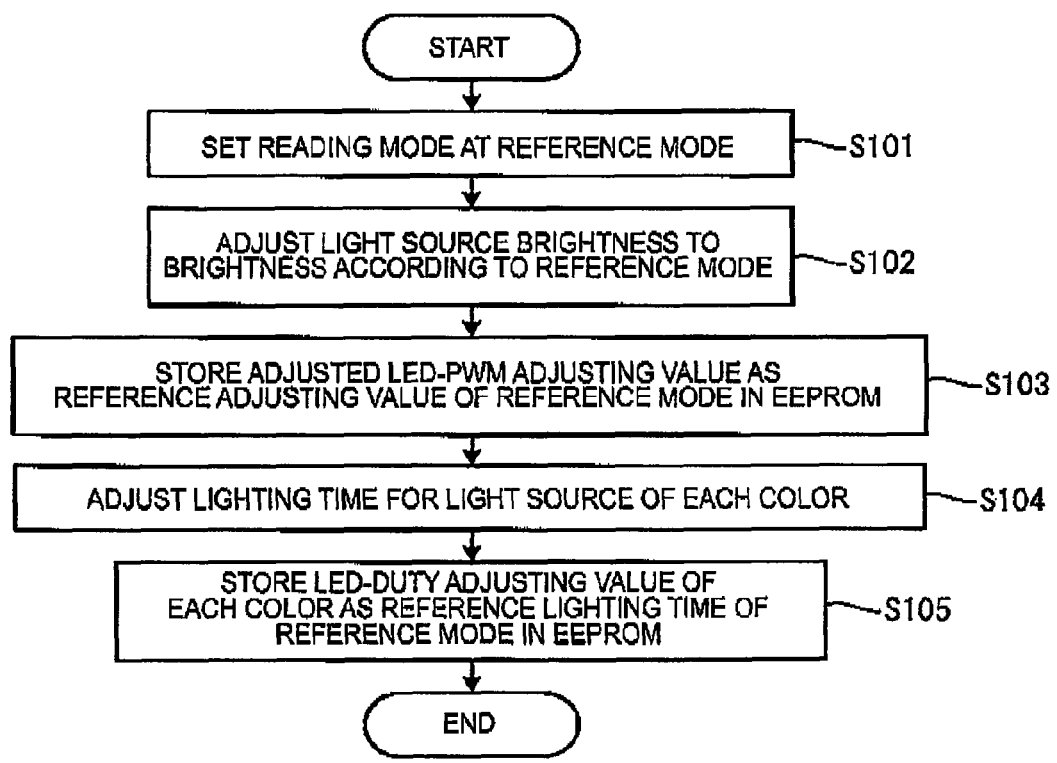
FIG. 6 is a flowchart illustrating a process of setting an reference adjusting value and a reference lighting time.

The process illustrated in FIG. 6 is executed in the state where the FB cover 5 is closed during manufacturing or before shipment. The red (R) light source 22R will herein illustratively be described as the light source.

In S101, the CPU 101 sets the reading mode to the reference mode. Thus, "600 dpi" is set to the resolution, while Ta [millisecond] is set to the lighting time.

In S102, the CPU 101 controls the belt mechanism 25 to move the reading device 21 to the area below the white reference member 19. Next, the CPU 101 turns on the light source 22R, causes the image reading device 1 to read the white reference member 19 and, based on a result of the reading, adjusts the LED-PWM adjusting value. The CPU 101 thus adjusts the brightness of the light source 22R to the brightness according to the reference mode. This adjusting manner is as described in "(4-1) Adjustment of Brightness of Light Source".

In S103, the CPU 101 stores the LED-PWM adjusting value adjusted in S102 as the reference adjusting value of the reference mode in the EEPROM 104.

In S104, the CPU 101 adjusts the lighting time of the light source 22R to the lighting time according to the reference mode. This adjusting manner is as described in "(4-2) Adjustment of Lighting Time".

In S105, the CPU 101 stores the LED-DUTY adjusting value adjusted in S104 as the reference lighting time of the reference mode in the EEPROM 104.

Thus, the process of storing the reference adjusting value and the reference lighting time of the reference mode terminates. While the red (R) light source 22R is hereinabove illustratively described, it is similar also with respect to the green (G) light source 22G and the blue (B) light source 22B.

(6) Document Reading

Next, the document reading will be described.

(6-1) General Process of Document Reading

Figure 7:
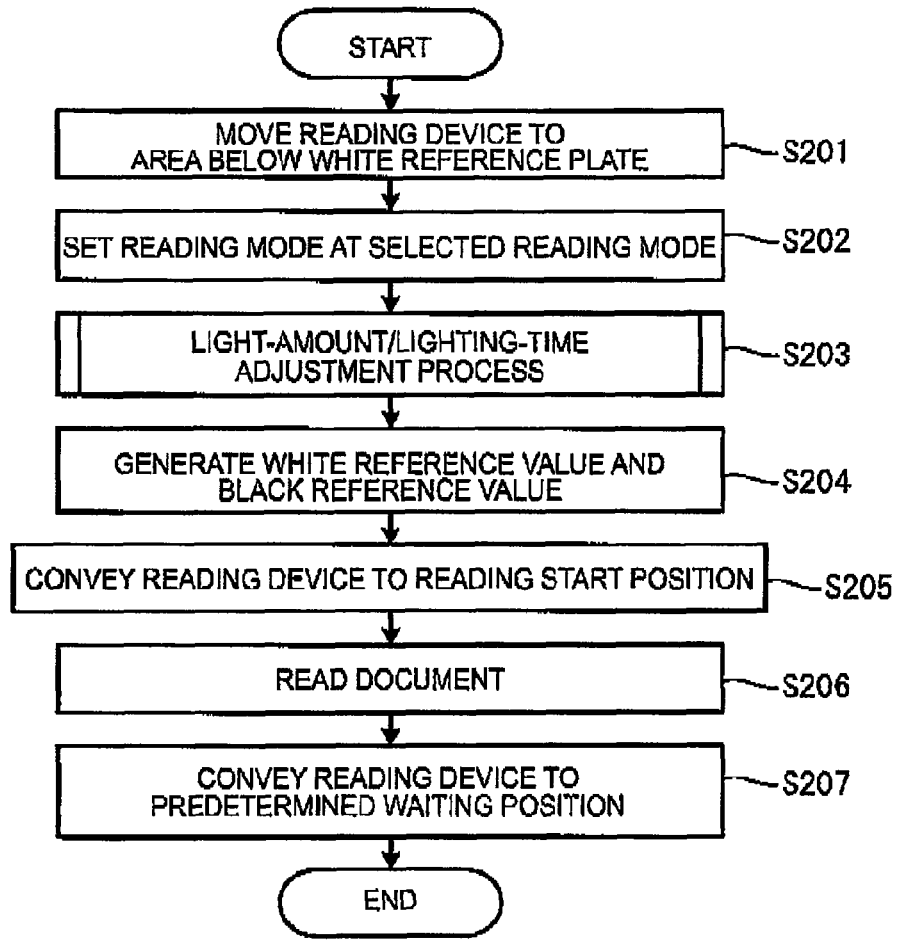
FIG. 7 is a flowchart illustrating a general process of document reading.
Figure 8:
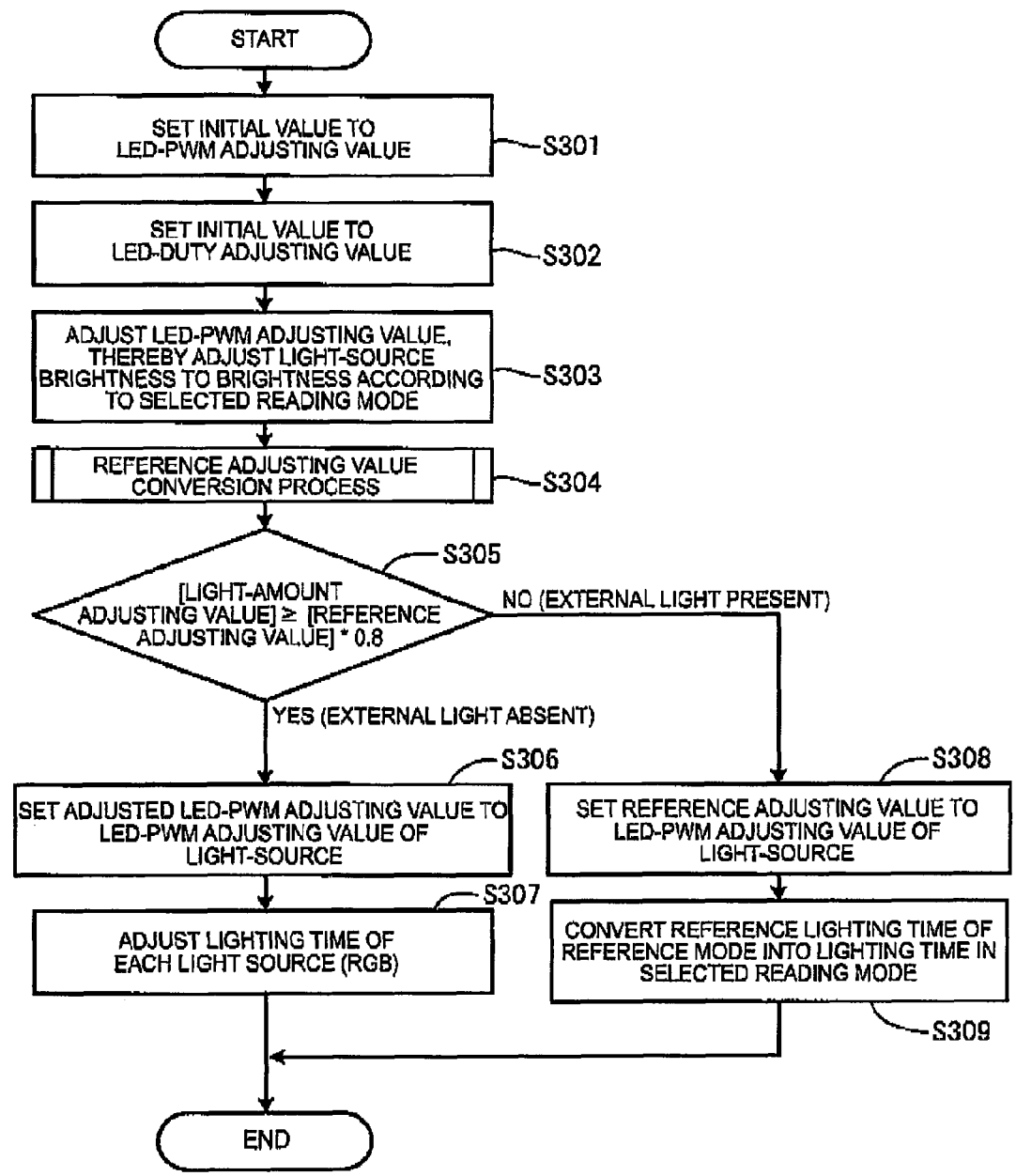
FIG. 8 is a flowchart illustrating a brightness/lighting-time setting process.
Figure 9:
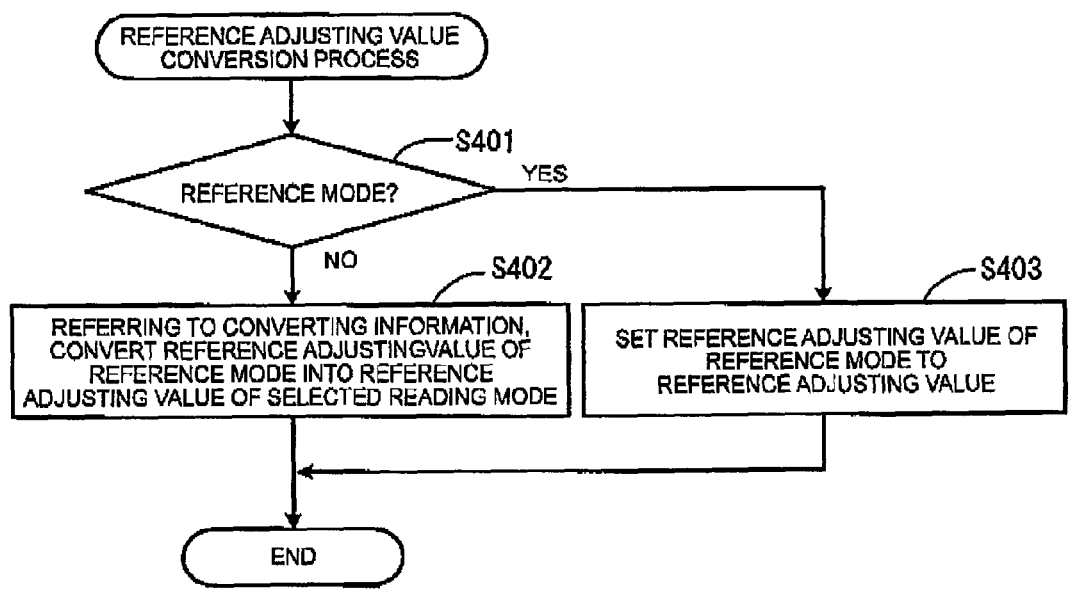
FIG. 9 is a flowchart illustrating an reference adjusting value conversion process.

The process illustrated in FIG. 7 starts upon selection of any one of the reading modes and the instruction to read a document by the user.

In S201, the CPU 101 controls the belt mechanism 25 to move the reading device 21 to the area below the white reference member 19.

In S202, the CPU 101 sets to the selected reading mode. Thus, values according to the selected reading mode are set to the resolution, the lighting time, and a reading speed.

In S203, the CPU 101 executes a "brightness/lighting-time adjustment process". The "brightness/lighting-time adjustment process" is a process to adjust the brightness (the LED- PWM adjusting value) and the lighting time (the LED-DUTY adjusting value) of the light source 22. The "brightness/lighting-time adjustment process" will be described below.

In S204, the CPU turns on the light source 22 at the LED-PWM adjusting value and the LED-DUTY adjusting value that have been adjusted in S203, the reading device 21 reads the white reference member 19, and generates the white reference value for shading correction. Thereafter, the CPU 101 turns off the light source 22, operates reading, and generates the black reference value for shading correction.

In S205, the CPU 101 controls the belt mechanism 25 to convey the reading device 21 to a reading start position.

In S206, the CPU 101 turns on the light source 22 at the LED-PWM adjusting value and the LED-DUTY adjusting value that have been adjusted in S203 and the reading device 21 reads the document line by line while controlling the belt mechanism 25 to convey the reading device 21 at the reading speed according to the reading mode.

In S207, the CPU 101, at termination of the reading in S206, conveys the reading device 21 to a predetermined waiting position.

The document reading thus terminates.

(6-2) Brightness/Lighting-Time Adjustment Process

The brightness/lighting-time adjustment process is operated for each of the RGB light sources. The red (R) light source 22R will herein illustratively be described.

In S301, the CPU 101 sets the initial value to the LED-PWM adjusting value.

In S302, the CPU 101 sets the initial value to the LED-DUTY adjusting value.

In S303, the CPU 101 adjusts the LED-PWM adjusting value so that the accumulation amount of charge outputted by reading the white reference member 19 becomes the "target value of the accumulation amount of charge of the selected reading mode". Thus, the CPU 101 adjusts the brightness of the light source 22R to the brightness according to the selected reading mode.

In S304, the CPU 101 executes an "reference adjusting value conversion process". The "reference adjusting value conversion process" is a process to convert the reference adjusting value of the reference mode into an "reference adjusting value of the selected reading mode". The "reference adjusting value conversion process" will be described below.

In S305, the CPU 101 compares the LED-PWM adjusting value that has been adjusted in S303 with the "reference adjusting value of the selected reading mode" that has been converted in S304. Thus, the CPU 101 determines whether the external light is incident on the platen glass 13.

Specifically, if the LED-PWM adjusting value that has been adjusted in S303 is equal to or more than 80% of the "adjusted reference value of the selected reading mode", the CPU 101 determines that the external light is absent, and the process goes to S306. If the LED-PWM adjusting value is less than 80%, the CPU 101 determines that the external light is present, and the process goes to S308. Note that it is a matter of design that can be suitably selected whether to apply 80% as the basis for determination of presence or absence of the external light.

In S306, the CPU 101 sets the adjusted LED-PWM value that has been adjusted in S303 to be the LED-PWM adjusting value of the light source 22R.

In S307, the CPU 101 adjusts the LED-DUTY adjusting value, thereby adjusting the lighting time of the light source 22R to the lighting time according to the selected reading mode.

In S308, the CPU 101 sets the "reference adjusting value of the selected reading mode" that has been converted in S304 to be the LED-PWM adjusting value of the light source 22R.

In S309, the CPU 101 obtains the lighting-time ratio from the conversion table and multiplies the reference lighting time of the reference mode by the reciprocal of the lighting-time ratio (the ratio obtained by dividing the lighting time of the reading mode by the lighting time of the reference mode). Thus, the CPU 101 converts the reference lighting time of the reference mode into the "lighting time in the selected reading mode".

Thus, the brightness/lighting-time adjustment process terminates. While the red (R) light source 22R is herein illustratively described, it is similar also with respect to the green (G) light source 22G and the blue (B) light source 22B.

(6-3) Reference Adjusting Value Conversion Process

The red (R) light source 22R will herein illustratively be described as the light source.

In S401, the CPU determines whether the selected reading mode is the reference mode. If it is not the reference mode, the process goes to S402. If it is the reference mode, the process goes to S403.

In S402, the CPU 101 refers to the converting information and converts the reference adjusting value of the reference mode into the "reference adjusting value of the selected reading mode". Specifically, the CPU 101 obtains the resolution ratio and the lighting-time ratio from the conversion table and performs the conversion using a formula as follows:

[Reference adjusting value of the selected reading mode]=[reference adjusting value of the reference mode]*[resolution ratio]*[lighting-time ratio]   Formula 3

In S403, the CPU 101 sets the reference adjusting value of the reference mode just as it is to be the reference adjusting value.

Thus, the reference adjusting value conversion process terminates. Note that, while the red (R) light source 22R is herein illustratively described as the light source, it is similar also with respect to the green (G) light source 22G and the blue (B) light source 22B.

(7) Effects of This Illustrative Aspect

Comparing the LED-PWM adjusting value (the light-source adjusting value) adjusted in the state where the external light is incident on the platen glass 13 with the LED-PWM adjusting value adjusted in the state where the external light is not incident, there is a difference therebetween. Accordingly, presence or absence of the external light can be determined by storing the LED-PWM adjusting value adjusted in the state where the external light is not incident as the reference adjusting value in advance and, thereafter, comparing the adjusted LED-PWM adjusting value with the reference adjusting value.

Note here that, in a case where the brightness of the light source 22 is different depending on the reading mode, comparison with the same reference adjusting value of all reading modes is a possible cause of mistaken determination of presence or absence of the external light. The reason of this is that there are occasions as follows: in one of the reading modes, the deviation between the LED-PWM adjusting value and the reference adjusting value is smaller in spite that the external light is incident, which leads to the mistaken determination that the external light is absent; while, in another one of the reading modes, the deviation between the LED-PWM adjusting value and the reference adjusting value is larger in spite that the external light is not incident, which leads to the mistaken determination that the external light is present.

With the image reading device 1 of the first illustrative aspect in accordance with the present invention, the reference adjusting value of the reference mode is converted into the reference adjusting value of the reading mode selected at the operation device 130, and the light-source adjusting value adjusted according to the selected reading mode is compared with the reference adjusting value of the reading mode. This makes it possible to determine presence or absence of the external light with better accuracy even if the brightness of the light source is different depending on the reading mode.

Furthermore, with the image reading device 1, because the reference adjusting value of the reference mode is converted into the reference adjusting values of the reading modes, it is unnecessary to store the adjusted reference value of each of the reading mode. This makes it possible to utilize the EEPROM 104 with higher efficiency.

Thus, the image reading device 1 makes it possible to determine presence or absence of the external light with better accuracy and with higher efficiency even if the brightness of the light source 22 is different depending on the reading mode.

Furthermore, if it is determined that the external light is present, the image reading device 1 turns on the light source 22 at the reference adjusting value of the selected reading mode. Therefore, in comparison with a case of turning on the light source 22 at the light-source adjusting value that the brightness of the light source 22 is adjusted in the state where the external light is present, the light source 22 can be turned on at a proper brightness.

Furthermore, the image reading device 1 can convert the reference adjusting value of the reference mode into the reference adjusting value of the selected reading mode on a basis of the proportional relation between the reading resolution and the LED-PWM adjusting value, by multiplying the reference adjusting value of the reference mode by the resolution ratio.

Furthermore, the image reading device 1 can convert the reference adjusting value of the reference mode into the reference adjusting value of the selected reading mode on a basis of the reciprocal proportional relation between the lighting time and the LED-PWM adjusting value, by multiplying the reference adjusting value of the reference mode by the lighting-time ratio.

Furthermore, the image reading device 1 can convert the reference lighting time of the reference mode into the lighting time of the selected reading mode by multiplying the reference lighting time of the reference mode by the reciprocal of the lighting-time ratio (the ratio obtained by dividing the lighting time of the reading mode by the lighting time of the reference mode). Conversion of the lighting time of the reference mode into the lighting time of the reading mode makes it unnecessary to store the lighting time of each reading mode. Therefore, the EEPROM 104 can be utilized with higher efficiency.

<Other Aspects>

The present invention is not limited to the illustrative aspect described as above with reference to the drawings. For example, the following illustrative aspects are also included within the scope of the present invention.

(1) In the above illustrative aspect, the resolution ratio and the lighting time are illustratively described as the converting information. In a case where the reading speed is not different depending on the reading mode, the resolution ratio alone may be used as the converting information.

(2) In the above illustrative aspect, the image reading device 1 included as the image reading device by the multi-function machine is illustratively described. The image reading device may be a so-called image scanner having the scanner function alone.

(3) In the above illustrative aspect, the R, G, B LEDs are illustratively described as the light source. The light source may be a cold cathode light tube (CCLV) that emits a so-called white light source.

(4) In the above-described illustrative aspect, the plurality of reading modes that are different from each other in the brightness of the light source 22 in the document reading are illustratively described. The reading modes may be same with each other in the brightness of the light source while different from each other in the lighting time alone. In this case, it may be such that the lighting time adjusted in the reference mode is identified as the reference adjusting value, while the reference adjusting value of the reference mode and the converting information to convert the reference adjusting value of the reference mode into the reference adjusting values of the reading modes are stored in advance. Then, when adjusting the lighting time in the selected reading mode, the adjusted lighting time and the reference adjusting value of the selected reading mode arc compared so that presence or absence of the external light is determined.

What is claimed is:

1. An image reading device comprising:
a platen configured to allow a document to be placed thereon;
a reading device including a light source for emitting light toward the document placed on the platen, the reading device being configured to read the document on a basis of the light emitted from the light source and reflected by the document;
a reference member configured to reflect the light emitted from the light source;
a selecting device configured to select one of a plurality of reading modes that are different from each other in brightness of the light source when reading the document;
a light-source adjusting device configured to adjust brightness of the light source to a brightness corresponding to the one of the plurality of reading modes selected by the selecting device, wherein the light-source adjusting device causes the reading device to read the reference member and adjusts a light-source adjusting value based on a result of the reading;
a storage configured to store a reference adjusting value and converting information, the reference adjusting value being the light-source adjusting value adjusted in a state where external light is not incident on the platen in a reference mode of the plurality of reading modes, the converting information being for converting the reference adjusting value of the reference mode into the reference adjusting value of another one of the plurality of reading modes;
a first converting device configured to refer to the converting information and convert the reference adjusting value of the reference mode into the reference adjusting value of the selected reading mode; and
a determining device configured to determine a presence or an absence of external light incident on the platen, wherein the determining device compares the reference adjusting value with the light-source adjusting value, the reference adjusting value of the selected reading mode being converted by the first converting device, the light-source adjusting value being adjusted by the light-source adjusting device.

2. The image reading device according to claim 1, wherein:
upon determination by the determining device that the external light is present, the light-source adjusting device turns on the light source at the reference adjusting value of the selected reading-mode while the reading device reads the document, the reference adjusting value being converted by the first converting device; and
upon determination by the determining device that the external light is absent, the light-source adjusting device turns on the light source at the light-source adjusting value adjusted with the light-source adjusting device while the reading device reads the document.

3. The image reading device according to claim 1, wherein:
the plurality of reading modes are different in reading-resolutions from each other;
the converting information is resolution ratios obtained by dividing the reading-resolutions of the plurality of reading modes by the reading-resolution of the reference mode; and
the first converting device converts the reference adjusting value of the reference mode into the reference adjusting value of the selected reading mode on a basis of the reference adjusting value of the reference mode and a resolution ratio corresponding to the selected reading mode.

4. The image reading device according to claim 3, further comprising a conveying device configured to convey the reading device in a subscanning direction, wherein:
the reading device includes a line sensor extending in a main scanning direction;
the reading device reads the document line by line while controlling the conveying device to convey the reading device;
the plurality of reading modes are different from each other in lighting times per line;
the converting information is lighting-time ratios, the lighting-time ratios being obtained by dividing a lighting time of the reference mode by lighting times of the reading modes; and
the first converting device converts the reference adjusting value of the reference mode into the reference adjusting value of the selected reading mode on a basis of the reference adjusting value of the reference mode and the lighting-time ratio corresponding to the selected reading mode.

5. The image reading device according to claim 4, wherein:
the storage stores the lighting time of the light source per line in the reference mode as a reference lighting time; and
the image reading device further comprises:
a second converting device configured to convert the reference lighting time of the light source in the reference mode into a lighting time of the light-source in the selected reading mode, wherein the second converting device multiplies the reference lighting time of the light source in the reference mode by a reciprocal of the lighting-time ratio of the selected reading mode.

* * * * *